United States Patent [19]

Emery

[11] 3,713,982

[45] Jan. 30, 1973

[54] ENZYME CHEMICALLY COUPLED TO CELLULOSE ETHER

[75] Inventor: Antohny Nicholas Emery, Birmingham, Warwickshire, England

[73] Assignee: Ranks Hovis McDougall Limited, London, England

[22] Filed: March 17, 1970

[21] Appl. No.: 20,389

[30] Foreign Application Priority Data

Dec. 11, 1969 Great Britain.....................60,474/69

[52] U.S. Cl. ..........................195/63, 99/48, 195/68, 195/DIG. 11
[51] Int. Cl..............................C07g 7/02, C12n 1/00
[58] Field of Search ...............195/63, 63 P, 68; 99/48

[56] References Cited

UNITED STATES PATENTS

| | | | |
|---|---|---|---|
| 3,597,219 | 8/1971 | Wildi et al. | 99/48 |
| 3,167,485 | 1/1965 | Katchalski et al. | 195/63 |
| 3,117,004 | 1/1964 | McFarlane et al. | 99/48 |
| 3,282,702 | 11/1966 | Schreiner | 195/63 X |

OTHER PUBLICATIONS

Barker et al., Preparation and Properties of α-Amylase Chemically Coupled to Microcrystalline Cellulose. Carbohydrate Research. Vol. 8, 1968 (pp. 491–497) QD321C3.

Dixon, et al., Enzymes, Academic Press Inc., N.Y. 2nd Ed. 1964 (p. 346) QP601.D5EC.2.

Silman, et al., Water–Insoluble Derivatives of Enzymes, Antigens and Antibodies Annual Review of Biochemistry Vol. 35 Part II 1966 (pp. 881–886) QP501A7.

*Primary Examiner*—Lionel M. Shapiro
*Assistant Examiner*—David M. Naff
*Attorney*—Stevens, Davis, Miller & Mosher

[57] ABSTRACT

A process for the preparation of a water insoluble papain which process comprises reacting at 0°–3°C. the papain dissolved in a buffer within a pH range of 6.5–8.5 and containing L-cysteine and diaminoethane tetra-acetic acid with the p-diazophenoxy hydroxypropyl ether of cellulose.

6 Claims, No Drawings

ENZYME CHEMICALLY COUPLED TO CELLULOSE ETHER

This invention is for improvements in or relating to enzymes and has particular reference to the modification of enzymes by attachment to solid matrices.

More particularly this invention relates to the water insolubilization of enzymes by chemically attaching them to cellulose derivatives and has as an object the provision of enzyme preparations in a form where they can be reused repeatedly and be more stable to heat than the corresponding soluble enzyme.

It is well known that when an enzyme is attached to an insoluble support the novel micro-environment of the enzyme markedly affects its stability. Hydrophilic features of the carrier tend to enhance the stability of the attached enzyme whereas hydrophobic features have the opposite effect. Polysaccharide carriers such as fibrous cellulose (M.A. Mitz and L.J. Summaria, Nature, London, 189, (1961), 576 & W.E. Hornby, M.D., Lilly and E.M. Crook, Biochem, J., 98, (1966), 420) and cross-linked dextran (R. Axen and J. Porath, Nature, London, 210, (1966), 367) have been shown to be particularly effective in conferring stability to the attached enzyme.

Commercial samples of water insoluble forms of trypsin, chymotrypsin, ribonuclease, glucose oxidase and ficin became available in February 1968. These were obtained by reaction of the appropriate enzyme with carboxymethyl cellulose hydrazide and are marketed by Seravac Laboratories, Ltd., Maidenhead, Berks.

Almost simultaneously (January 1968) Miles Laboratories, Inc., Elkhart, U.S.A., marketed water insoluble forms of trypsin, chymotrypsin and papain in which the enzymes were bound to ethylene-maleic anhydride copolymer carrier.

R. Axen and J. Porath, Nature 210 (1966), 367, succeeded in preparing active water insoluble chymotrypsin and trypsin by reaction of the enzymes with p-isothiocyanato phenoxy hydroxypropyl — "Sephadex" (cross-linked dextran).

Our copending British application No. 14074/69 provided active water insoluble preparations of other enzymes i.e., pullulanase, carboxypeptidase and dextranase wherein the enzyme is chemically coupled with the p-diazophenoxyhydroxypropyl ether derived from microcrystalline cellulose.

It is an object of the present invention to provide an active water-insoluble preparation of papain wherein the enzyme is chemically coupled with the P-diazophenoxyhydroxypropyl ether derived from microcrystalline cellulose.

The present invention provides a water insoluble papain chemically coupled to p-diazophenoxyhydroxypropyl cellulose.

According to the present invention there is provided a process for the preparation of a water insoluble papain which process comprises reacting at 0°–3°C. the papain dissolved in a buffer within a pH range 6.5–8.5 and containing L-cysteine and diaminoethane tetra-acetic acid with the p-diazophenoxy hydroxypropyl ether of cellulose.

A water insoluble preparation of papain may be made by chemical reaction of the papain dissolved in a buffer within a pH range of 6.5–8.5 (preferably phosphate buffer 0.075M, pH 6.9) containing L-cysteine, 5mM., and diaminoethane tetra-acetic acid, 2mM. Unreacted diazo groups in the cellulose derivative can be annealed by reaction with $\beta$-naphthol or phenol. Preferably micro-crystalline cellulose is used for the preparation of this ether. An active water-insoluble papain can be obtained by this process which is more heat stable when suspended in an aqueous buffer (0.02M) than the corresponding soluble enzyme. Preferably the buffer should have that pH at which the enzyme displays maximum enzymic activity towards it substrate.

The particular merits of the present invention for providing water-insoluble papain is that it can provide a product with a high retention of activity when calculated as a percentage of the activity which that amount of enzyme protein bound to the cellulose derivative would display in its original soluble form. The second advantage is that the use of micro-crystalline cellulose in the preparation of the ether affords a dense hydrophilic carrier available in a fine particulate form for maximum surface exposure yet easily recoverable after use by centrifugation or filtration and which is then suitable for reuse. Alternatively the water-insoluble enzyme may be used to treat, for example, Beer, on a continuous basis for an extended period of time. The third advantage is the much greater heat stability of the water insoluble enzyme giving a greater shelf life and enabling the enzyme to be used at a higher operating temperature and for a longer period of time.

Following is a description by way of example of methods of carrying the invention into effect:

EXAMPLE I

Samples (100 mg.) of p-amino phenoxy hydroxypropyl cellulose ether (prepared according to the method of Barker, S.A., Somers, P.J., and Epton, R., Carbohydrate Research 8, 491, (1968)) were placed in a centrifuge tube. Aliquots (5 ml.) of ice-cold, 1N hydrochloric acid were added and the slurry stirred magnetically for 15 minutes at 0°C. Aliquots (4 ml.) of ice-cold 2 percent sodium nitrite solution were added and after a further 15 minutes the tubes were centrifuged and the supernatant discarded. The solid was washed 3 times with aliquots (15 ml.) of phosphate buffer (0.075M pH 6.5–8.5). After the final washings had been decanted, aliquots (1 ml.) of a solution of papain (10 mg/ml activity 0.148 units/mg protein) in phosphate buffer (0.075M pH 6.5–8.5) containing L-cysteine (5mM) and EDTA (diaminoethane tetra-acetic acid) (2mM), were added and the tubes stirred magnetically at 0°–3°C. for 48 hours. After coupling, 5 ml. of an ice-cold 0.01 percent solution of $\beta$-naphthol in saturated aqueous sodium acetate were added. After a further 15 minutes stirring, the water insoluble papain derivatives were subjected to 5 cycles of washing with phosphate buffer (0.03M pH 6.9 15 ml.) and sodium chloride solution (0.5M) in the same buffer. The papain derivatives were finally washed twice with phosphate buffer (0.02M pH 6.9).

The activity of the water insoluble papain was determined in the following manner. Samples were suspended (or dissolved in the case of free papain) in phosphate buffer (5 ml. 0.075M pH 6.5). 5 Ml. of activator solution, (L-cysteine 5mM and EDTA 2mM)

were added and the mixture allowed to incubate with 10 ml. of a pre-warmed 2 percent casein solution, stirred magnetically at 600 r.p.m. 4 ml. aliquots were removed at intervals and added to 2 ml. of 10 percent trichloracetic acid in test tubes, agitated, and allowed to stand for 5 minutes. The optical density of the solutions was read at 280 m$\mu$. in an SP 500 Unicam spectrophotometer using 1 cm. silica cuvettes. The activities were calculated from a plot of the optical density change with time.

RESULTS

| Prep. No. | pH of coupling | mg bound protein per 100 mg derivative | Enzyme units/ mg bound protein | Enzyme activity retention % |
|---|---|---|---|---|
| 1 | 6.5 | 1.23 | 0.051 | 34.5 |
| 2 | 7.5 | 1.30 | 0.048 | 32.5 |
| 3 | 8.5 | 1.09 | 0.049 | 33.1 |

EXAMPLE II

A sample of water-insoluble papain (10 mg.) was prepared according to Example I. The coupling was carried out at pH 6.9 and gave a derivative containing 0.81 mg. protein per 100 mg. derivative and with a specific activity equal to 0.041 enzyme units/mg protein. The sample was suspended in phosphate buffer (0.02M pH 6.9, 5 ml.), mixed with an activator solution (5 ml. containing L-cysteine 5mM and EDTA 2mM) and incubated with 10 ml. of a pre-warmed 2 percent casein solution at 50°C. for 1 hour in a magnetically stirred test tube, after which the samples were rapidly cooled and the papain activity assayed at 30°C.

A control incubation was performed in which the water insoluble papain was replaced by a solution of an equivalent amount of free papain in phosphate buffer (0.02M pH 6.9 5 ml.) and activator solution (5 ml.).

Results

| Prep. No. | Initial activity O.D. units/min. | Final activity O.D. units/min. | % retention of activity |
|---|---|---|---|
| diazo 4 coupled | 0.0033 | 0.0030 | 90.8 |
| Free enzyme | 0.0120 | 0.0048 | 40.0 |

EXAMPLE III

A sample of water insoluble papain was prepared as in Example I. The coupling was carried out at pH 6.9 and gave a derivative containing 0.809 mg. protein/100 mg. carrier and with a specific activity of 0.105 enzyme units per mg. of protein.

1 g. of the water insoluble papain derivative was placed in a plastic 1 liter centrifuge pot. Two 1 pint bottles of Beer (original gravity 1.035, fermented for 5 days, chilled and filtered) were opened and poured into the centrifuge pot. Potassium metabisulphite was added (50 mg/l.) and the Beer was then magnetically stirred at room temperature for 72 hours. The pot was centrifuged for 15 minutes at 1,100 g., the Beer decanted back into bottles, which were crowned and repasteurized. Further bottles were opened and treated in the same way for periods of 24 hours and 18 hours using the same solid. After the final treatment the water-insoluble papain was washed in distilled water and resuspended in phosphate buffer (0.02M pH 6.9 100 ml.). An aliquot (5 ml.) of the suspension was assayed as before.

The bottles of treated Beer, together with similar but untreated controls were stored for alternate periods at 4°C. and room temperature to accelerate the development of haze. Haze readings were taken at intervals.

RESULTS

A.

| Prep. No. | Activity of papain (O.D. units/min.) | Activity Retention % |
|---|---|---|
| 5 Initially | $8.9 \times 10^{-2}$ | — |
| 5 After 10 days treatment | $4.7 \times 10^{-2}$ | 53 |

B.

| Time of treatment | Haze (E.B.C. Units) Days of incubation | | | |
|---|---|---|---|---|
| | 0 | 12 | 14 | 15 |
| 72 hours | 2.5 | 3.3 | 2.5 | 2.3 |
| 24 hours | 2.5 | 6.3 | 8.8 | 9.3 |
| 18 hours | 2.5 | 6.4 | 9.7 | 10.5 |
| CONTROL | 2.5 | 9.8 | 13.0 | >13 |

EXAMPLE IV

Samples (10 mg.) of water insoluble papain (preparation No.4, 0.81 mg. protein/mg solid derivative) were suspended in phosphate buffer (5 ml., 0.075M pH 6.5). Dilutions of casein (0.032–0.8mM) were prepared in phosphate buffer (5 ml. 0.075M pH 6.5), taking a 1 percent casein solution as equivalent to 0.4mM. The velocity of the initial reaction of the water insoluble papain on casein for each dilution was determined by the method in Example I.

RESULTS

| Initial casein concentration mM | Initial Reaction Velocity O.D. units/min. |
|---|---|
| 0.032 | 0.0012 |
| 0.08 | 0.0023 |
| 0.16 | 0.0035 |
| 0.8 | 0.0080 |

I claim:

1. A process for the preparation of a water insoluble enzymatically active papain which process comprises reacting at 0°–3°C. the papain dissolved in a buffer within a pH range of 6.5–8.5 and containing L-cysteine and diaminoethane tetra-acetic acid with the p-diazophenoxy hydroxypropyl ether of cellulose.

2. A process as claimed in claim 1 wherein the pH is between 6.8 and 7.0.

3. A process as claimed in claim 1 wherein unreacted diazo groups in the cellulose derivative are annealed by reaction with $\beta$-naphthol or phenol.

4. A process as claimed in claim 1 wherein microcrystalline cellulose is used for the preparation of the ether.

5. Enzymatically active papain chemically coupled to p-diazophenoxyhydroxypropyl cellulose.

6. A process as defined in claim 1, wherein the pH is between 6.5 and 7.0.

* * * * *